US010455007B2

(12) United States Patent
Fawcett et al.

(10) Patent No.: US 10,455,007 B2
(45) Date of Patent: Oct. 22, 2019

(54) MANAGING ASSET PLACEMENT WITH RESPECT TO A DISTRIBUTED COMPUTING ENVIRONMENT HAVING A SET OF HOSTS

(71) Applicant: International Business Machines Corporation, Armonk, NY (US)

(72) Inventors: Bradley W. Fawcett, Byron, MN (US); Jason A. Nikolai, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 15/210,853

(22) Filed: Jul. 14, 2016

(65) Prior Publication Data
US 2018/0020049 A1    Jan. 18, 2018

(51) Int. Cl.
*H04L 29/08* (2006.01)
*H04L 12/14* (2006.01)
*H04M 15/00* (2006.01)

(52) U.S. Cl.
CPC .......... *H04L 67/1008* (2013.01); *H04L 12/14* (2013.01); *H04L 12/1428* (2013.01); *H04L 67/10* (2013.01); *H04L 67/303* (2013.01); *H04M 15/31* (2013.01); *H04M 15/41* (2013.01)

(58) Field of Classification Search
CPC ............. H04L 67/1008; H04L 12/1428; H04L 67/1023; H04L 67/303
USPC ....................................................... 709/226
See application file for complete search history.

(56) References Cited

U.S. PATENT DOCUMENTS

| 6,651,082 | B1 | 11/2003 | Kawase et al. |
|---|---|---|---|
| 8,125,984 | B2 | 2/2012 | Giles et al. |
| 8,706,869 | B2 | 4/2014 | Campion et al. |
| 8,826,292 | B2 | 9/2014 | Heim |
| 8,868,963 | B2 | 10/2014 | Fawcett |
| 8,966,084 | B2 | 2/2015 | Dow et al. |
| 9,063,788 | B2 | 6/2015 | Gedik et al. |
| 9,135,057 | B2 | 9/2015 | Branson et al. |
| 9,672,054 | B1 * | 6/2017 | Gupta ............. G06F 9/45533 |

(Continued)

OTHER PUBLICATIONS

International Business Machines Corporation; "IBM InfoSphere Streams Version 4.1.1: Operators: spl 1.2.1"; <http://www.ibm.com/support/knowledgecenter/SSCRJU_4.1.1/com.ibm.streams.toolkits.doc/spldoc/dita/tk$spl/ix$Operator.html>.

(Continued)

*Primary Examiner* — Nicholas R Taylor
*Assistant Examiner* — Chong G Kim
(74) *Attorney, Agent, or Firm* — Rakesh Roy

(57) ABSTRACT

Disclosed aspects relate to managing asset placement with respect to a distributed computing environment or a stream computing environment. A set of host computing resource requirement data is detected. The detection is with respect to an asset for placement to the distributed computing environment. The set of host computing resource requirement data is for the asset such as a set of stream operators or a set of processing elements. A set of computing resource profile data for a set of hosts is identified. By comparing the set of host computing resource requirement data for the asset and the set of computing resource profile data for the set of hosts, an asset placement arrangement is determined. Based on the asset placement arrangement, the asset is established.

17 Claims, 9 Drawing Sheets

(56) References Cited

U.S. PATENT DOCUMENTS

| | | | |
|---|---|---|---|
| 10,048,996 B1* | 8/2018 | Bell | G06F 11/079 |
| 2013/0097319 A1* | 4/2013 | Ahmad | G06F 9/5033 |
| | | | 709/226 |
| 2013/0325906 A1* | 12/2013 | Qiu | G06F 17/303 |
| | | | 707/803 |
| 2014/0165063 A1* | 6/2014 | Shiva | G06F 9/45533 |
| | | | 718/1 |
| 2015/0039767 A1* | 2/2015 | Matczynski | H04L 47/70 |
| | | | 709/226 |
| 2015/0052528 A1* | 2/2015 | French | G06F 9/4856 |
| | | | 718/1 |
| 2015/0113144 A1* | 4/2015 | Bauer | H04L 47/70 |
| | | | 709/226 |
| 2016/0043968 A1* | 2/2016 | Jacob | H04L 47/808 |
| | | | 709/226 |
| 2016/0269313 A1* | 9/2016 | Brooker | G06F 9/5072 |
| 2016/0316003 A1* | 10/2016 | Snider | H04L 67/1002 |
| 2017/0149687 A1* | 5/2017 | Udupi | H04L 47/78 |

OTHER PUBLICATIONS

Feldman et al.; "Label Based Scheduling"; <https://issues.apache.org/jira/secure/attachment/12654148/LabelBasedScheduling.pdf>.
Wikimedia Foundation, Inc.; "Completely Fair Scheduler"; <https://en.wikipedia.org/wiki/Completely_Fair_Scheduler>.
Bellovin, Steven M.; "Linux Scheduler"; Columbia University; <https://www.cs.columbia.edu/~smb/classes/s06-4118/l13.pdf>.
Seeker, Volker; "Process Scheduling in Linux"; University of Edinburgh; <http://criticalblue.com/news/wp-content/uploads/2013/12/linux_scheduler_notes_final.pdf>.

* cited by examiner

MANAGING ASSET PLACEMENT WITH RESPECT TO A DISTRIBUTED COMPUTING ENVIRONMENT HAVING A SET OF HOSTS

BACKGROUND

This disclosure relates generally to computer systems and, more particularly, relates to managing asset placement with respect to a distributed computing environment having a set of hosts. A distributing computing environment can include a stream computing environment. The amount of stream computing data that needs to be managed by enterprises is increasing. Management of compute nodes in stream computing environments may be desired to be performed as efficiently as possible. As stream computing data needing to be managed increases, the need for management efficiency may increase.

SUMMARY

Aspects of the disclosure relate to automated placement and movement of processing elements based on application defined, self-declaring host tags within a dynamic cluster or cloud environment for streaming analytics. Aspects include an automated dynamic tagging solution that allows for placement and relocation based on application prerequisites determined before job submission. Accordingly, placement and relocation of applications may occur based on the needs of the application. Various embodiments include monitoring and taking-action to restart a processing element when prerequisites are not met. In embodiments, data may be updated and tags may be dynamically added when prerequisites are met. Various embodiments include predicting when prerequisites are not going to be met and beginning to evacuate or move a processing element when a threshold is met.

Disclosed aspects relate to managing asset placement with respect to a distributed computing environment or a stream computing environment. A set of host computing resource requirement data is detected. The detection is with respect to an asset for placement to the distributed computing environment. The set of host computing resource requirement data is for the asset such as a set of stream operators or a set of processing elements. A set of computing resource profile data for a set of hosts is identified. By comparing the set of host computing resource requirement data for the asset and the set of computing resource profile data for the set of hosts, an asset placement arrangement is determined. Based on the asset placement arrangement, the asset is established.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
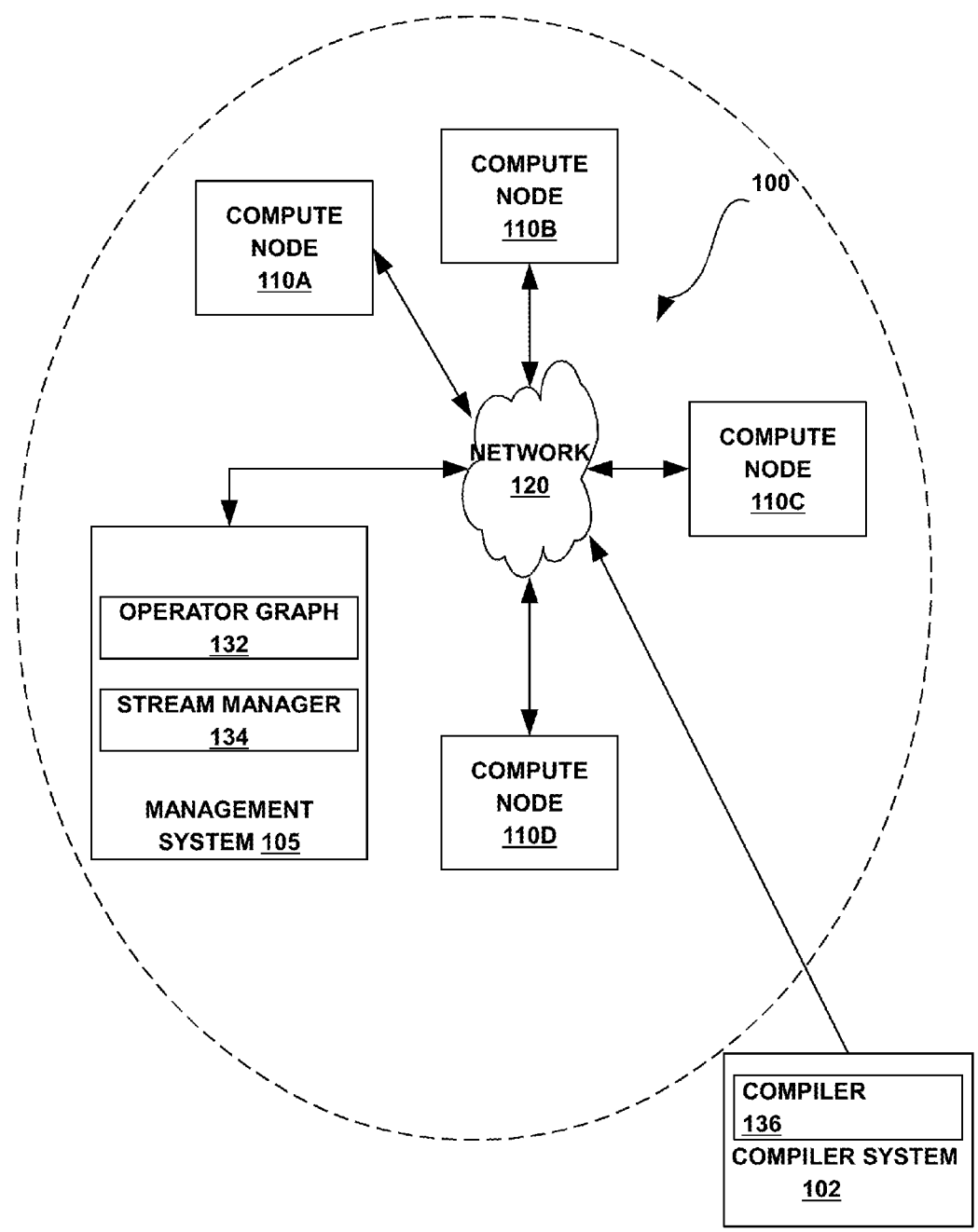
FIG. 1 illustrates an exemplary computing infrastructure to execute a stream computing application according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to automated placement and movement of processing elements based on application defined, self-declaring host tags within a dynamic cluster or cloud environment for streaming analytics. Aspects include an automated dynamic tagging solution that allows for placement and relocation based on application prerequisites determined before job submission. Accordingly, placement and relocation of applications may occur based on the needs of the application. For instance, an application can be written by a developer. The developer may specify one or more resource requirements needed for one or more operators/processing elements in the application. The application can be compiled and submitted to a run-time (e.g., a streams run-time in a stream computing environment). Aspects of the disclosure can may inquire of a set of hosts as to whether the set of hosts can take-on/accept the one or more operators/processing elements based on the one or more resource requirements. As such, the set of hosts may make a determination and respond accordingly.

Various embodiments include monitoring and taking-action to restart a processing element when prerequisites are not met (e.g., relocation when prerequisites are no longer met such as removing a hidden tag and automatically placing the processing element on a host machine that meets the needs of the processing element/stream operator). In embodiments, data may be updated and tags may be dynamically added when prerequisites are met (e.g., disk become available, hardware is added, software is installed). Various embodiments include predicting when prerequisites are not going to be met and beginning to evacuate or move a processing element when a threshold is met (e.g., to prevent relocation downtime utilizing a feature to predict that a host machine will soon not meet the needs of the processing element/stream operator in order to communicate with the scheduler to restart the processing element thereby initiating a relocation).

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

A streams processing job has a directed graph of processing elements that send data tuples between the processing elements. The processing element operates on the incoming tuples, and produces output tuples. A processing element has an independent processing unit and runs on a host. The streams platform can be made up of a collection of hosts that are eligible for processing elements to be placed upon. When a job is submitted to the streams run-time, the platform scheduler processes the placement constraints on the processing elements, and then determines (the best) one of these candidates host for (all) the processing elements in that job, and schedules them for execution on the decided host.

Aspects of the disclosure include a method, system, and computer program product for managing asset placement with respect to a distributed computing environment (e.g., a stream computing environment) having a set of hosts. In embodiments, the set of hosts can be for processing a stream of tuples using a set of processing elements. A set of host computing resource requirement data is detected. The detection is with respect to an asset for placement to the distributed computing environment. The set of host computing resource requirement data is for the asset (e.g., a set of stream operators, a set of processing elements). With respect to the distributed computing environment, a set of computing resource profile data for the set of hosts is identified. By comparing the set of host computing resource requirement data for the asset and the set of computing resource profile data for the set of hosts, an asset placement arrangement is determined. Based on the asset placement arrangement, the asset is established in the distributed computing environment.

In various embodiments, some applications have prerequisite requirements (e.g., a certain amount of storage in /tmp), a certain hardware component (e.g., crypto chip, graphics card), or dependency on a shared file system location. Such aspects may have manual action from users (e.g., manually tagging host machines and only allowing operators to be placed on hosts that have the specified tags) to specify where stream operators/processing elements can be placed. Also, removing such tags may entail a manual process. Accordingly, if a host machine no longer meets the needs of the operator (e.g., disk has filled-up), the scheduler may place the stream operator/processing element on a manually tagged node and the stream operator/processing element may not function properly. As such, automated dynamic tagging solution that allows for placement and relocation based on application prerequisites determined before job submission as described herein may positively impact performance or efficiency.

Aspects of the disclosure may enable an application developer/writer to define what placement requirements are needed for each independent operator. As such, it may not be dependent upon an administrator having to get involved manually. As described herein, manual tagging may no longer be needed. The application developer/writer can specify application requirements and the runtime can place the application appropriately across a set of hosts which may be heterogeneous. Also, dynamic movement of processing elements when requirements are no longer met or soon will no longer be met is a capability that may provide various performance or efficiency benefits.

In embodiments, the set of hosts is heterogeneous in nature (e.g., different operating systems, different versions of an operating system, different hardware architectures). In embodiments, the set of hosts is monitored to update the set of computing resource profile data. Accordingly, based on and in response to monitoring the set of hosts, the set of computing resource profile data may be updated. Altogether, performance or efficiency benefits with respect to managing a set of compute nodes which have different configurations in a stream computing environment may occur (e.g., wear-rate, service-length, reliability, speed, flexibility, load balancing, responsiveness, stability, high availability, resource usage, productivity). Aspects may save computing resources such as bandwidth, disk, processing, or memory.

FIG. 1 illustrates one exemplary computing infrastructure 100 that may be configured to execute a stream computing application, according to some embodiments. The computing infrastructure 100 includes a management system 105 (which can include an operator graph 132 and a stream manager 134) and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
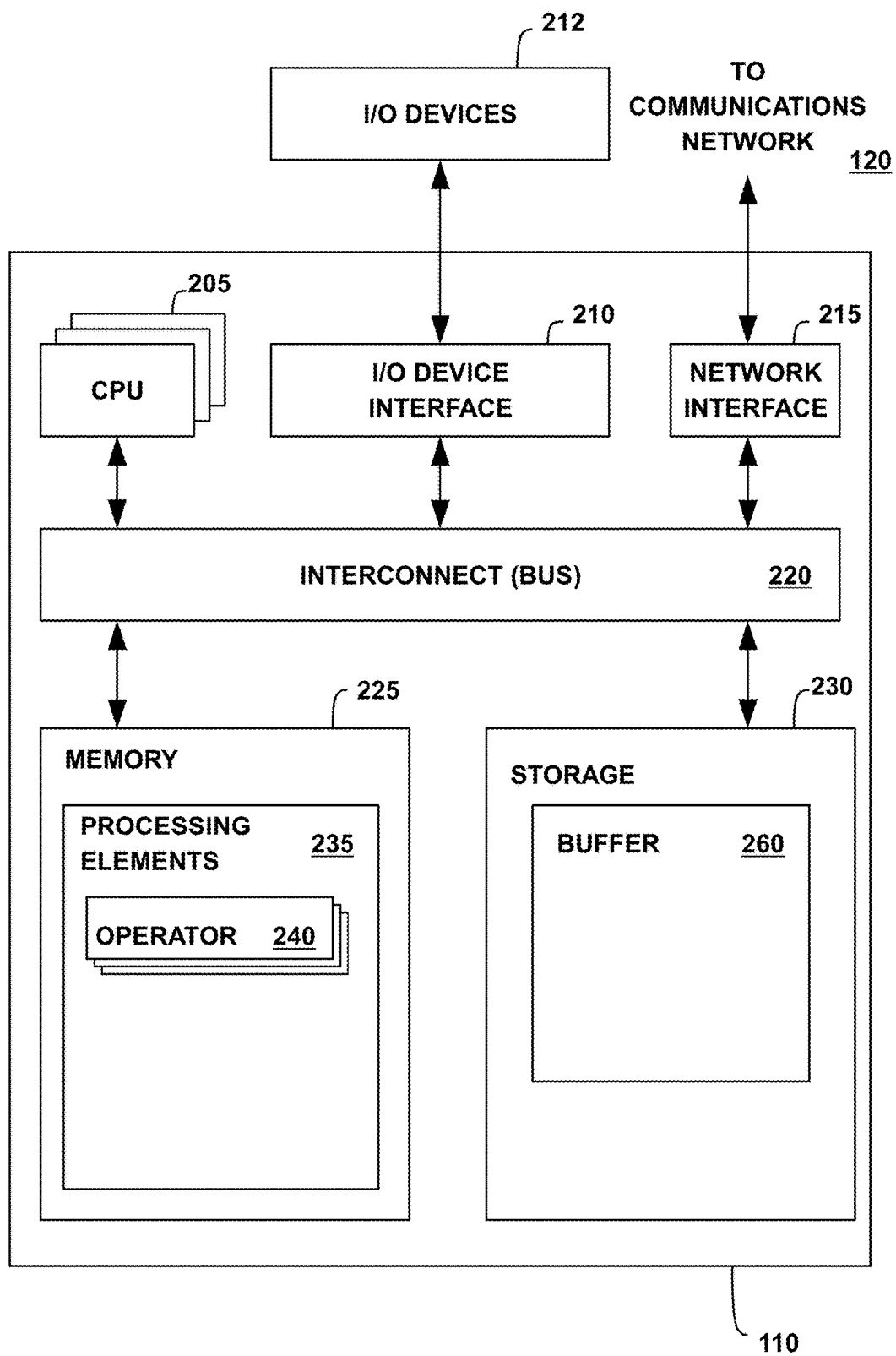
FIG. 2 illustrates a view of a compute node according to embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
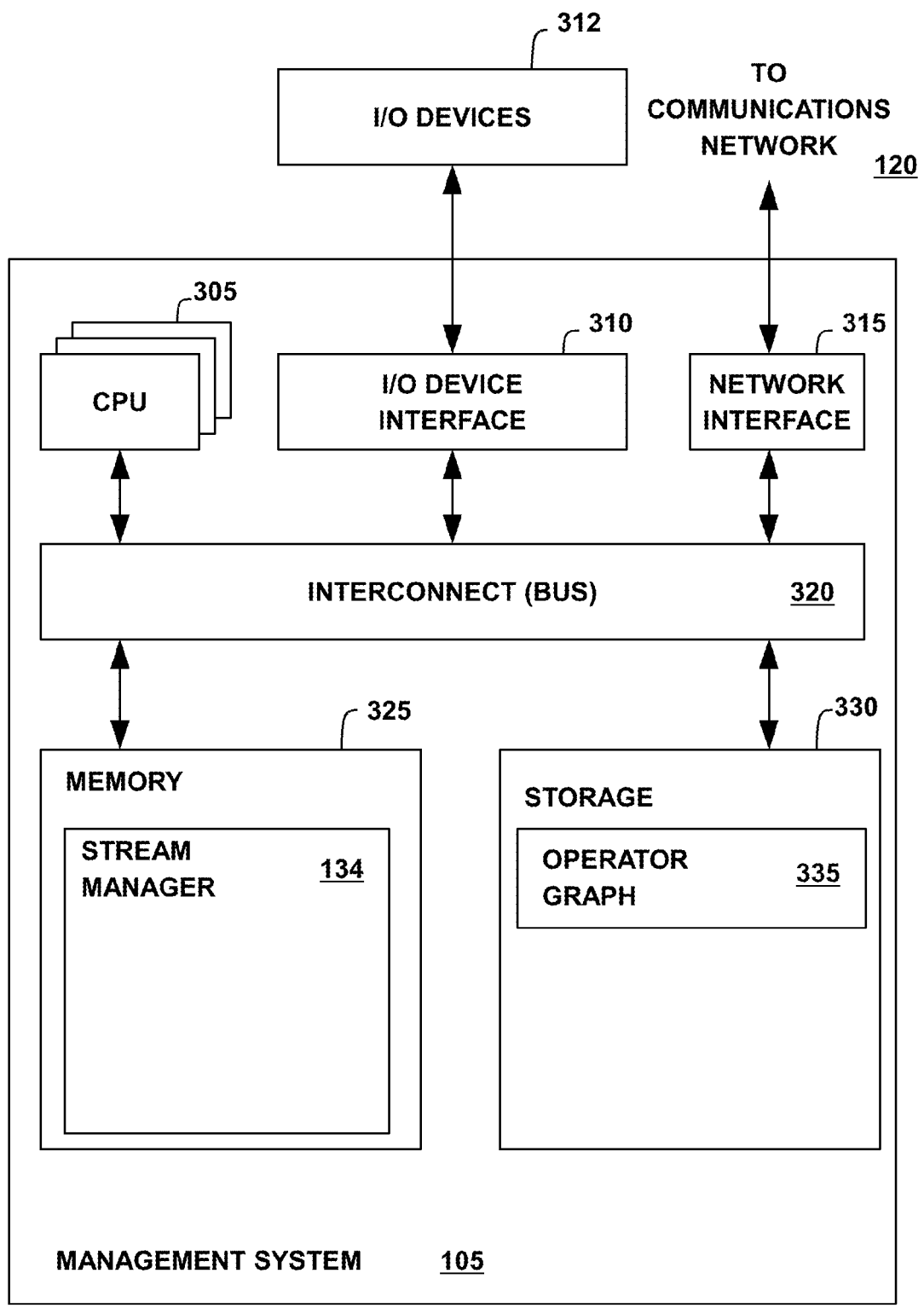
FIG. 3 illustrates a view of a management system according to embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing or stored in memory 325 (e.g., completely in embodiments, partially in embodiments).

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function. Portions of stream manager 134 or operator graph 335 may be stored in memory 325 or storage 330 at different times in various embodiments.

Figure 4:
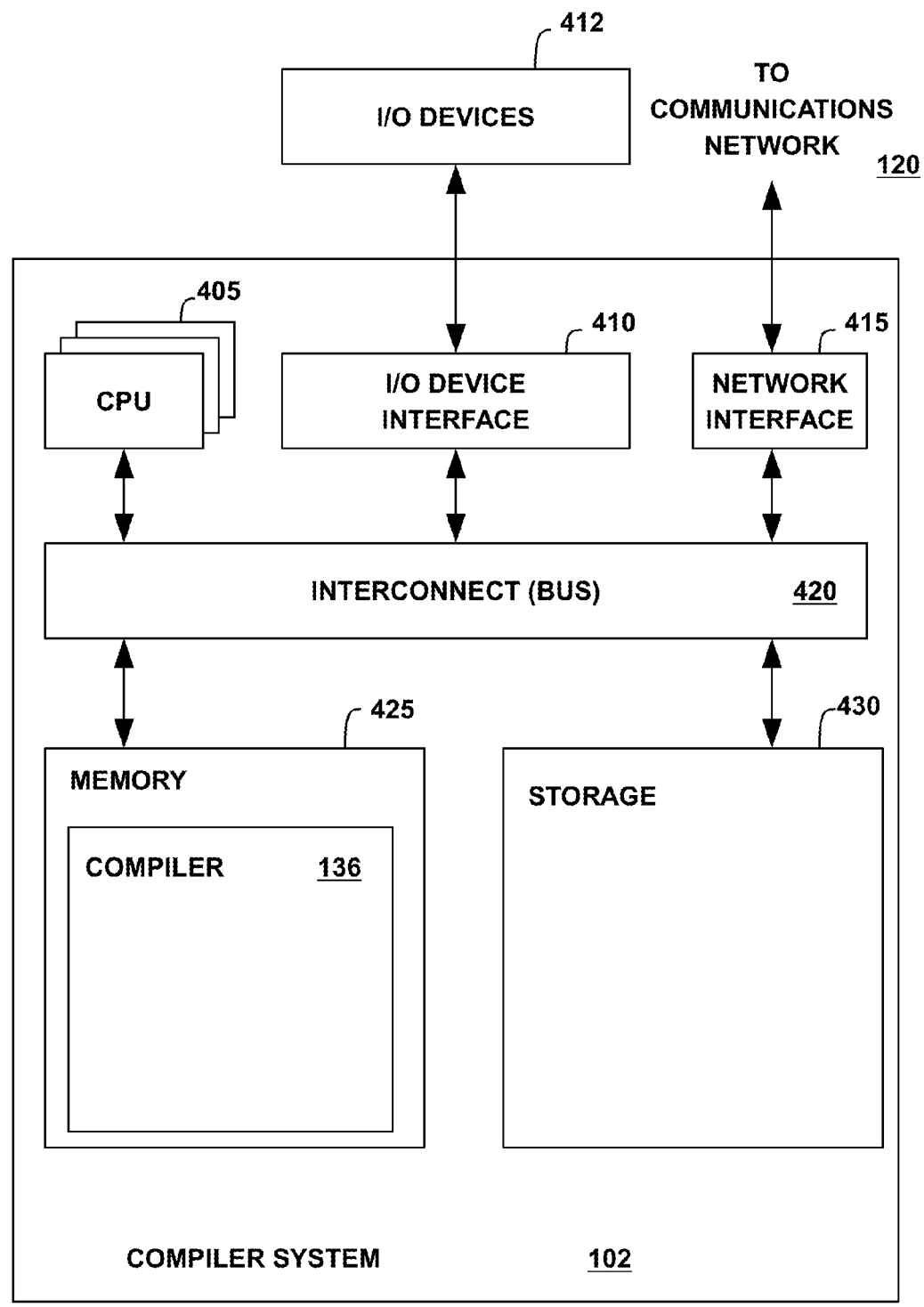
FIG. 4 illustrates a view of a compiler system according to embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

Figure 5:
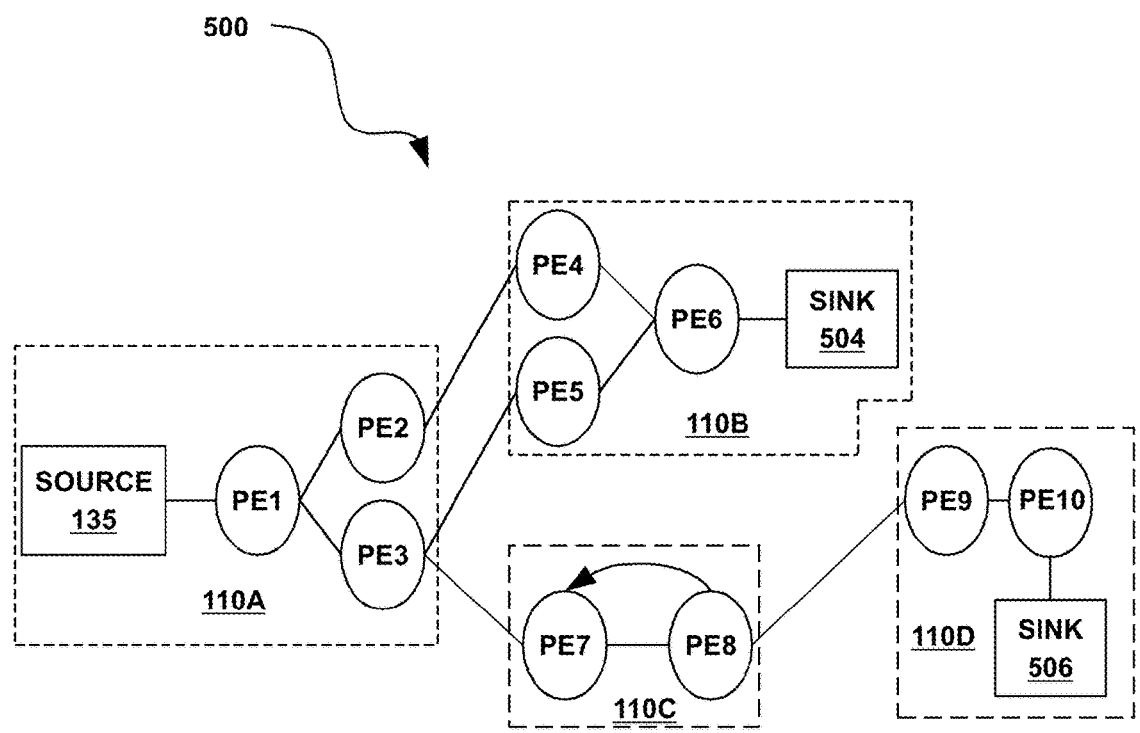
FIG. 5 illustrates an exemplary operator graph for a stream computing application according to embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to PE6 and to operator sink 504. Similarly, tuples flowing from PE3 to PE5 and to PE6 also reach the operators in sink 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
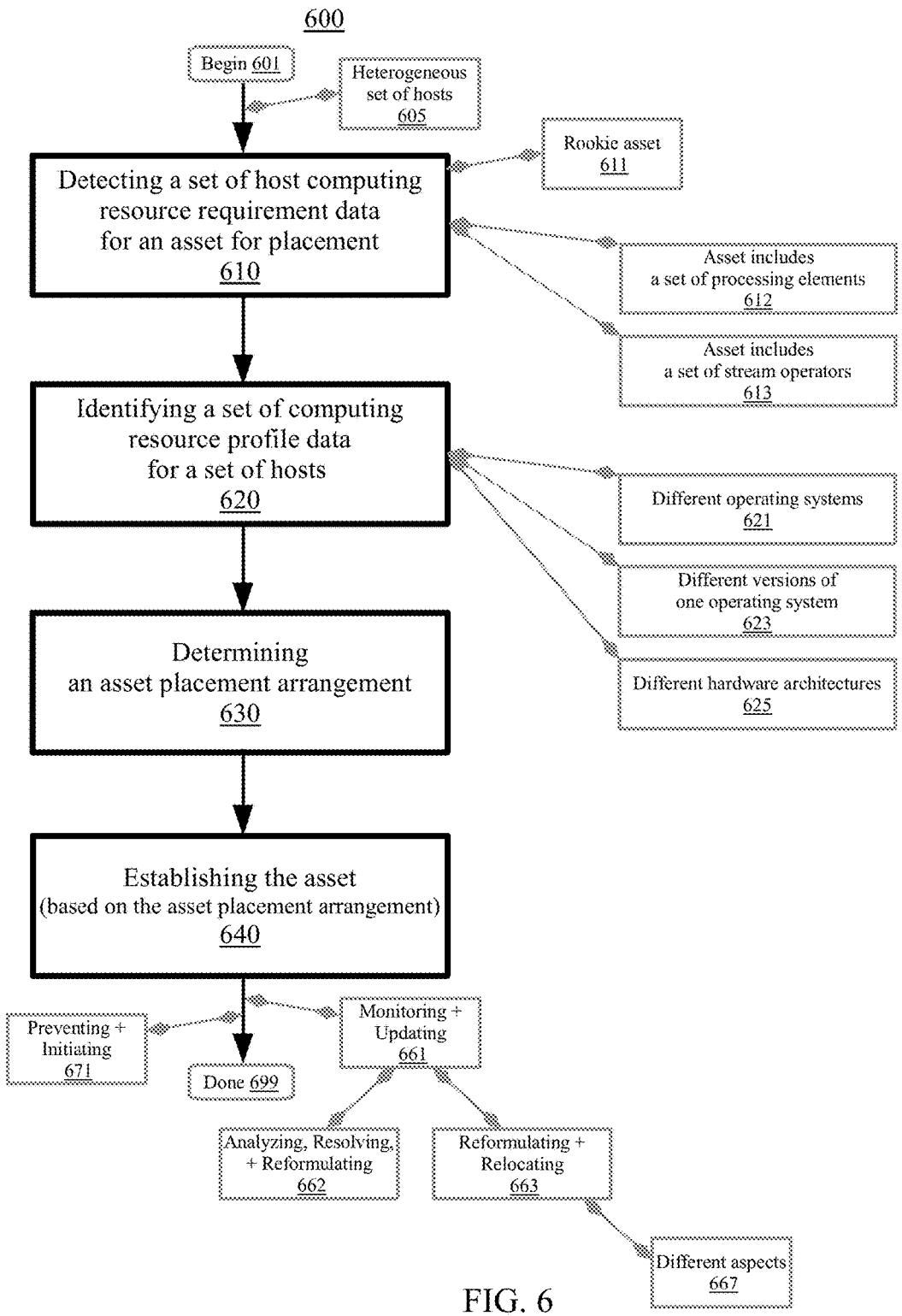
FIG. 6 is a flowchart illustrating a method for managing asset placement with respect to a distributed computing environment having a set of hosts, according to embodiments.

FIG. 6 is a flowchart illustrating a method 600 for managing asset placement with respect to a distributed computing environment having a set of hosts, according to embodiments. Aspects of the method 600 may substantially correspond to other embodiments described herein, including FIGS. 1-9 and the related descriptions. Method 600 may begin at block 601. The set of hosts may be considered heterogeneous in nature at block 605. In various embodiments, stream computing/processing applications may be run/executed on a cluster of systems that have mixed system typologies. The ability to construct the cluster to run stream applications out of a variety of system types may provide flexibility (e.g., to an administrator/user). For instance, such ability may be useful in a shared pool of configurable computing resources (e.g., a cloud-type resource management system). Such a shared pool may have a variety of host types, or various burdens/costs to using different configurations or host types.

At block 610, a set of host computing resource requirement data is detected. The detection is with respect to an asset for placement to the distributed computing environment. The set of host computing resource requirement data is for the asset. Placement can include initiation of deploying a particular asset to a chosen host in a shared pool of configurable computing resources. For instance, an application can specify one or more resource requirements and a detection engine can detect the one or more resource requirements that were specified. In certain embodiments, the asset can be a rookie at block 611. A rookie asset may include a specific asset that has run zero times in a given environment (e.g., distributed computing environment, stream computing environment). As such, the rookie asset may be entirely new to the given environment. Accordingly, historical configuration data for the rookie asset may be absent. In embodiments, the asset includes a set of processing elements at block 612. In embodiments, the asset includes a set of stream operators at block 613.

Detecting can include sensing, receiving, discovering, acquiring, or recognizing the set of host computing resource requirement data. In embodiments, the set of host computing resource requirement data can include a qualitative value (e.g., a specific type of component) or a quantitative value (e.g., a threshold amount of a feature). For example, a stream operator may target, desire, need, or require (of a host in order to be chosen for placement) a certain amount of file space in a directory (e.g., a threshold of at least 2 gigabytes), a certain hardware component (e.g., a non-x86 processor which has support for a hypervisor built into the chip), a specific software component (e.g., an ABC application which runs on a Linux (trademark of Linus Torvalds) operating system), or the like. Generally, the set of host computing resource requirement data may relate to parameters for an operating system, a version of an operating system, a hardware architecture, an expected reliability of components, an expected throughput of components, or the like (e.g., disk, processor, memory, software). The set of host computing resource requirement data may be collected (e.g., in a requirement catalog as an asset requirement tag associated with the asset). Various other possibilities are contemplated related to the set of host computing resource requirement data.

At block 620, a set of computing resource profile data for the set of hosts is identified with respect to the distributed computing environment. Identifying can include ascertaining, resolving, sensing, scanning, analyzing, evaluating, calculating, or recognizing. The set of hosts may have qualitative or quantitative features. For example, a host compute node may have a specific amount of available memory (e.g., 1 gigabyte of random access memory), a specific hardware component (e.g., an x86 processor), a certain software component (e.g., an XYZ application with runs on Red Hat (Red Hat is a registered trademark of Red Hat, Inc. in the United States and other countries) version 7), or the like. Generally, the set of computing resource profile data for the set of hosts may relate to parameters for an operating system, a version of an operating system, a hardware architecture, an expected reliability of components, an expected throughput of components, or the like (e.g., disk, processor, memory, software). The identification may be made in an automated fashion without user intervention/manual action (e.g., using automated computing machinery). As such, the set of computing resource profile data may be self-nominated/declared by the set of hosts. The set of computing resource profile data may be collected (e.g., in a host catalog as a host resource tag associated with a particular host). Various other possibilities are contemplated related to the set of computing resource profile data for the set of hosts.

In embodiments, the set of hosts includes a first host having a first operating system and a second host having a second operating system at block 621. For example, the first host may include a Linux operating system and the second host may include a Windows (Windows is a registered trademark of Microsoft Corporation in the United States and/or other countries) operating system. In embodiments, the first host includes a first version/level of a first operating system and the second host includes a second version/level of the first operating system at block 623. For example, the first host can have Red Hat version 6 and the second host can have Red Hat version 7.

In embodiments, the first host includes a first hardware architecture and the second host includes a second hardware architecture at block 625. For example, the first host may use a POWER (trademark of International Business Machines Corporation) or POWER-type processor and the second host may use an Intel (trademark of Intel Corporation or its subsidiaries in the U.S. and/or other countries) or Intel-type processor. In certain embodiments, the first host uses a first algorithm based on a first set of computing capabilities of the first host and the second host uses a second algorithm based on a second set of computing capabilities of the second host. For instance, the first and second hosts may use different algorithm implementations tailored to each execution host's capabilities (e.g., bandwidth factors, disk factors, processor factors, memory factors, software factors).

At block 630, an asset placement arrangement is determined. Determining can include ascertaining, resolving, evaluating, formulating, computing, calculating, or comparing. The asset placement arrangement can indicate which assets are placed on which hosts (e.g., Asset1 on HostA, Asset2 on HostC, Asset3 on HostB, Asset4 on HostA). For instance, the asset placement arrangement can indicate whether a particular host can/will accept a particular asset (e.g., Asset5 may be placed on HostE, Asset6 may not be placed on HostF). The determination may be made by the particular host itself (e.g., the set of hosts is a single host which decides and subsequently indicates with a communication related to acceptance/non-acceptance). The determination may be made in an automated fashion without user intervention/manual action (e.g., using automated computing machinery). The determination may be made by the set of hosts, a single host, or the like. An application developer/writer can specify placement requirements which are desired/needed for independent operators without involvement from an administrator for placement.

The determination may be made by comparing the set of host computing resource requirement data for the asset (e.g., contents of an asset requirement tag) and the set of computing resource profile data for the set of hosts (e.g., contents of a set of host resource tags). The comparison may relate to a quantitative or qualitative criterion specifying a degree of similarity, correlation, or correspondence between the set of host computing resource requirement data for the asset and the set of computing resource profile data for the set of hosts. The comparison may include validity ranges (e.g., both within 0.1 gigabytes of an available memory feature), validity thresholds (e.g., host has not less than a 1.5 gigahertz processor), matching criteria (e.g., both have a Linux operating system), or the like. Aspects may be utilized in a streaming environment with respect to illustrative constraints and factors considered by the scheduler such as a load of existing hosts, prior job placements, various application constraints (e.g. co-location, ex-location, isolation), or administrator preferences (e.g., other statically defined host tags). For instance, a determination engine on a host can determine whether or not the host can accept placement of a portion of an application (e.g., a processing element having a stream operator) on the host.

At block 640, the asset is established (in the distributed computing environment or in the stream computing environment) based on the asset placement arrangement. For example, the asset arrangement can be established to process the stream of tuples in the stream computing environment. Establishing can include creating, generating, compiling, structuring, constructing, assembling, forming, organizing, providing, or introducing. In embodiments, establishing the asset based on the asset placement arrangement may include initiating-deployment/deploying a stream operator, sizing/resizing a virtual machine, (re)organizing processing elements, providing a processing resource (e.g., 8 type X processors) on a selected host(s) for the asset, providing a memory resource (e.g., 5 gigabytes of type Y memory) on the selected host(s) for the asset, providing a disk resource (e.g., 2 type Z disk drives having 10 total terabytes of storage) on the selected host(s) for the asset, or the like. Leveraging the asset placement arrangement may facilitate management of computing resources and be associated with performance or efficiency benefits (e.g., resource availability, application throughput, computing resource efficiency) with respect to the distributed/stream computing environment.

In embodiments, a monitoring operation and an updating operation occur at block 661. In various embodiments, identifying the set of computing resource profile data for the set of hosts includes the monitoring and updating operations. The set of hosts may be monitored to update the set of computing resource profile data. Monitoring can include observing (e.g., watching a reference point of the set of computing resource profile data), querying (e.g., asking a question regarding the set of computing resource profile data), searching (e.g., exploring for a reason within the set of computing resource profile data), obtaining (e.g., recording a collection related to the set of computing resource profile data), probing (e.g., checking a property of the set of computing resource profile data), scanning (e.g., reviewing a sample of the set of computing resource profile data), surveying (e.g., polling a constituent portion of the set of computing resource profile data), or tracking (e.g., following a characteristic of the set of computing resource profile data). Based on and in response to monitoring the set of hosts, the set of computing resource profile data may be updated. Updating can include modifying, changing, adding, deleting, removing, or eliminating a value/entry of the set of computing resource profile data. For example, an amount of available memory may be monitored and, in response to a change in the amount of available memory, the value for available memory in the set of computing resource profile data can be updated. Such updating may occur on a temporal period/frequency (e.g., once per hour, once per day, every day at noon) or based on a triggering event (e.g., a stream operator requests more resources, a new asset placement arrangement is established, an error event such as a virtual machine goes offline). Various possibilities for the monitoring and updating are contemplated.

In embodiments, the monitoring and updating may facilitate a prediction using analytics with respect to a trend for a set of hosts related to hosting one or more assets (e.g., predicting when a criterion is expected to not be met or no longer achieved and thereby recommending/initiating movement of the one or more assets elsewhere). In embodiments, an analyzing operation, a resolving operation, and a reformulating operation occur at block 662. The set of computing resource profile data can be analyzed to predict an expected change to the set of computing resource profile data (e.g., a disk space reduction). For instance, analyzing can include extracting (e.g., creating a derivation), examining (e.g., performing an inspection), scanning (e.g., reviewing a sample), evaluating (e.g., generating an appraisal), dissecting (e.g., scrutinizing an attribute), parsing (e.g., deciphering a construct), querying (e.g., asking a question), searching (e.g., exploring for a reason/ground/motivation), comparing (e.g., relating an assessment), classifying (e.g., assigning a designation), or categorizing (e.g., organizing by a feature). Data analysis may include a process of inspecting, cleaning, transforming, or modeling data to discover useful information, suggest conclusions, or support decisions. Data analysis can extract information/patterns from a data set and transform/translate it into an understandable structure (e.g., a data report which can be provided/furnished) for further use. Accordingly, the expected change to the set of computing resource profile data may be resolved (e.g., ascertaining an observation/conclusion/answer such as a quantity of open disk space). Based on the expected change to the set of computing resource profile data, the asset placement arrangement may be reformulated/redetermined (e.g., stream operators or processing elements may be determined to be moved/reassigned among the set of hosts due to a change in disk space). Various possibilities for the analyzing, resolving, and reformulating are contemplated.

In embodiments, the monitoring and updating may facilitate a host automatically withdrawing itself from current/future consideration for hosting one or more assets (e.g., when a criterion is not met or no longer achieved). In embodiments, a reformulating operation and a relocating operation occur at block 663. Based on and in response to updating the set of computing resource profile data, the asset placement arrangement can be reformulated/redetermined (e.g., stream operators or processing elements may be determined to be moved/reassigned among the set of hosts due to a change in the amount of available memory or processing resources). In response to updating the set of computing resource profile data and based on a reformulation of the asset placement arrangement, the asset may be relocated (e.g., moved, reassigned, reallocated, distributed) to a different host of the set of hosts (e.g., to a host with an appropriate amount of available memory or processing resources). In certain embodiments, the different host can have a different operating system, a different version of an operating system, or a different hardware architecture at block 667. As such, the reformulation and relocation may occur across heterogeneous hosts. Various possibilities for the reformulating and relocating are contemplated.

In embodiments, a preventing operation and an initiating operation occur at block 671. Placement of the asset on a first host of the set of hosts may be prevented (with respect to the asset placement arrangement). Such prevention may occur when a first computing resource profile data for the first host (e.g., 1 gigahertz of processing capability) does not achieve the set of host computing resource requirement data for the asset (e.g., 1.5 gigahertz of processing capability). With respect to the asset placement arrangement, placement/deployment/instantiation of the asset to a second host of the set of hosts may be initiated/commenced when a second computing resource profile data for the second host (e.g., 2 gigahertz of processing capability) achieves/exceeds the set of host computing resource requirement data for the asset (e.g., 1.5 gigahertz of processing capability). Various possibilities for the preventing and initiating are contemplated.

Method 600 concludes at block 699. Aspects of method 600 may provide performance or efficiency benefits for managing asset placement with respect to a distributed computing environment. For example, aspects of method 600 may have positive impacts with respect to processing a stream of tuples using a set of processing elements. Altogether, performance or efficiency benefits (e.g., load balancing, high availability, error event recovery, stability, speed, computing resource efficiency) may occur when managing asset placement in a stream computing environment.

Figure 7:
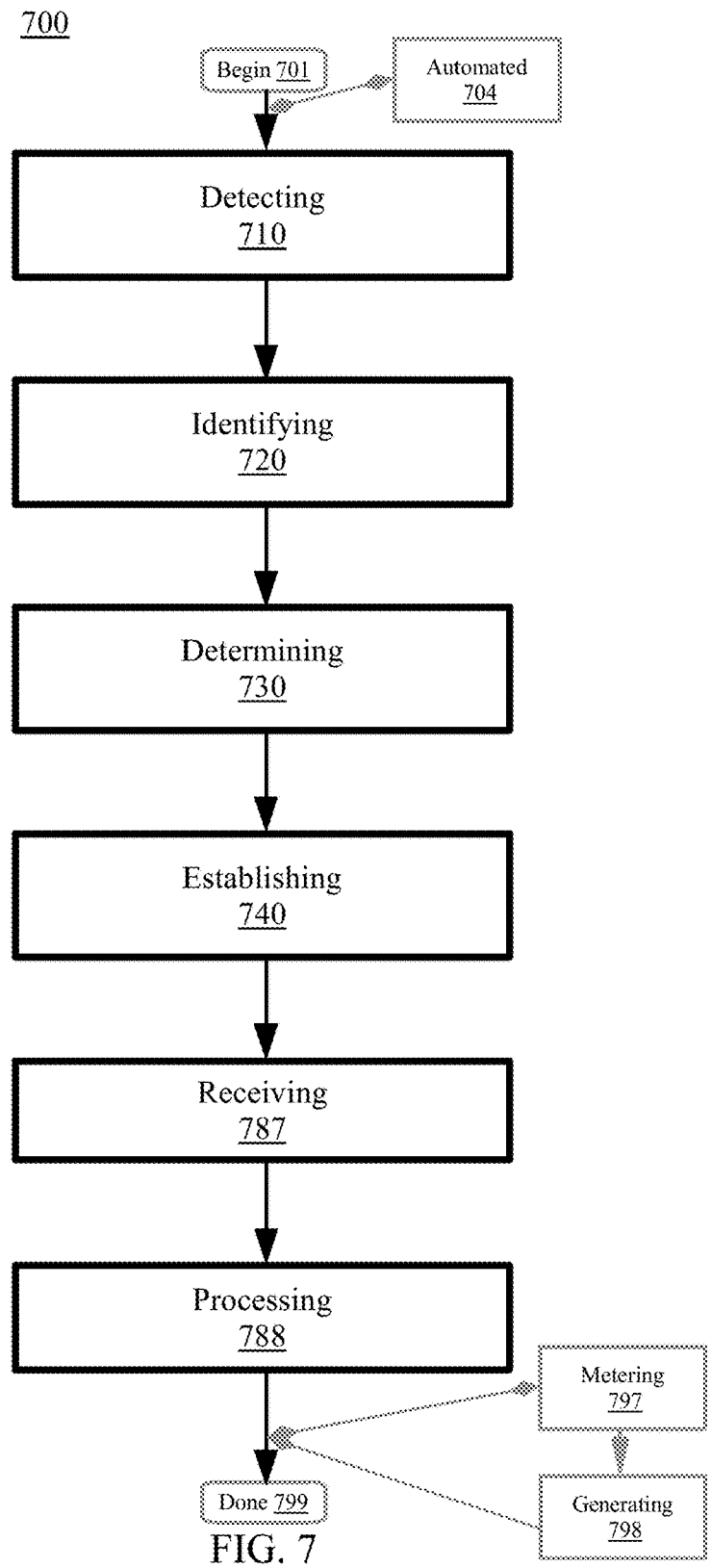
FIG. 7 is a flowchart illustrating a method for managing asset placement with respect to a distributed computing environment having a set of hosts, according to embodiments.

FIG. 7 is a flowchart illustrating a method 700 for managing asset placement with respect to a distributed computing environment having a set of hosts, according to embodiments. Aspects of the method 700 may substantially correspond to other embodiments described herein, including FIGS. 1-9 and the related descriptions. Method 700 may begin at block 701. At block 704, the operational steps such as the detecting, the identifying, the determining, and the establishing each occur in an automated fashion without user intervention (e.g., fully machine-driven without manual stimuli). The automated operational steps may be performed by a host management engine on a host. At block 710, a set of host computing resource requirement data is detected. The detection is with respect to an asset for placement to a stream computing environment. The set of host computing resource requirement data is for the asset. At block 720, a set of computing resource profile data for the set of hosts is identified with respect to the stream computing environment. At block 730, an asset placement arrangement is determined. The determination may be made by comparing the set of host computing resource requirement data for the asset and the set of computing resource profile data for the set of hosts. At block 740, the asset is established (in the stream computing environment) based on the asset placement arrangement.

At block 787, a stream of tuples is received. The stream of tuples may be processed by a set of processing elements operating on the set of hosts (in the stream application environment). The stream of tuples may be received consistent with the description herein including FIGS. 1-9. Current/future processing by the plurality of processing elements may be performed consistent with the description herein including FIGS. 1-9. The set of hosts may include a shared pool of configurable computing resources. For example, the set of hosts can be a public cloud environment, a private cloud environment, or a hybrid cloud environment. In certain embodiments, each of the set of hosts are physically separate from one another.

In embodiments, the stream of tuples is processed at block 788. The stream of tuples may be processed by the set of processing elements operating on the set of hosts. The stream of tuples may be processed consistent with the description herein including FIGS. 1-9. In embodiments, stream operators operating on the set of hosts may be utilized to process the stream of tuples. Processing of the stream of tuples by the set of processing elements may provide various flexibilities for managing the set of hosts. Overall flow (e.g., data flow) may be positively impacted by utilizing aspects described herein.

In certain embodiments, a usage assessment may be generated with respect to the asset. Use of the asset may be metered at block 797. For example, service-life extensions may be measured or functional up-time relative to a benchmark (e.g., historical functional up-time) can be evaluated, etc. Such factors may correlate to charge-back or cost burdens which can be defined in-advance (e.g., utilizing usage tiers) or scaled with respect to a market-rate. An invoice or bill presenting the usage, rendered services, fee, and other payment terms may be generated based on the metered use at block 798. The generated invoice may be provided (e.g., displayed in a dialog box, sent or transferred by e-mail, text message, initiated for traditional mail) to the user for notification, acknowledgment, or payment.

Method 700 concludes at block 799. Aspects of method 700 may provide performance or efficiency benefits for managing asset placement with respect to a stream computing environment. For example, aspects of method 700 may have positive impacts with respect to processing a stream of tuples using a set of processing elements. Altogether, performance or efficiency benefits (e.g., load balancing, high availability, error event recovery, stability, speed, computing resource efficiency) may occur when managing asset placement in the stream computing environment.

Figure 8:
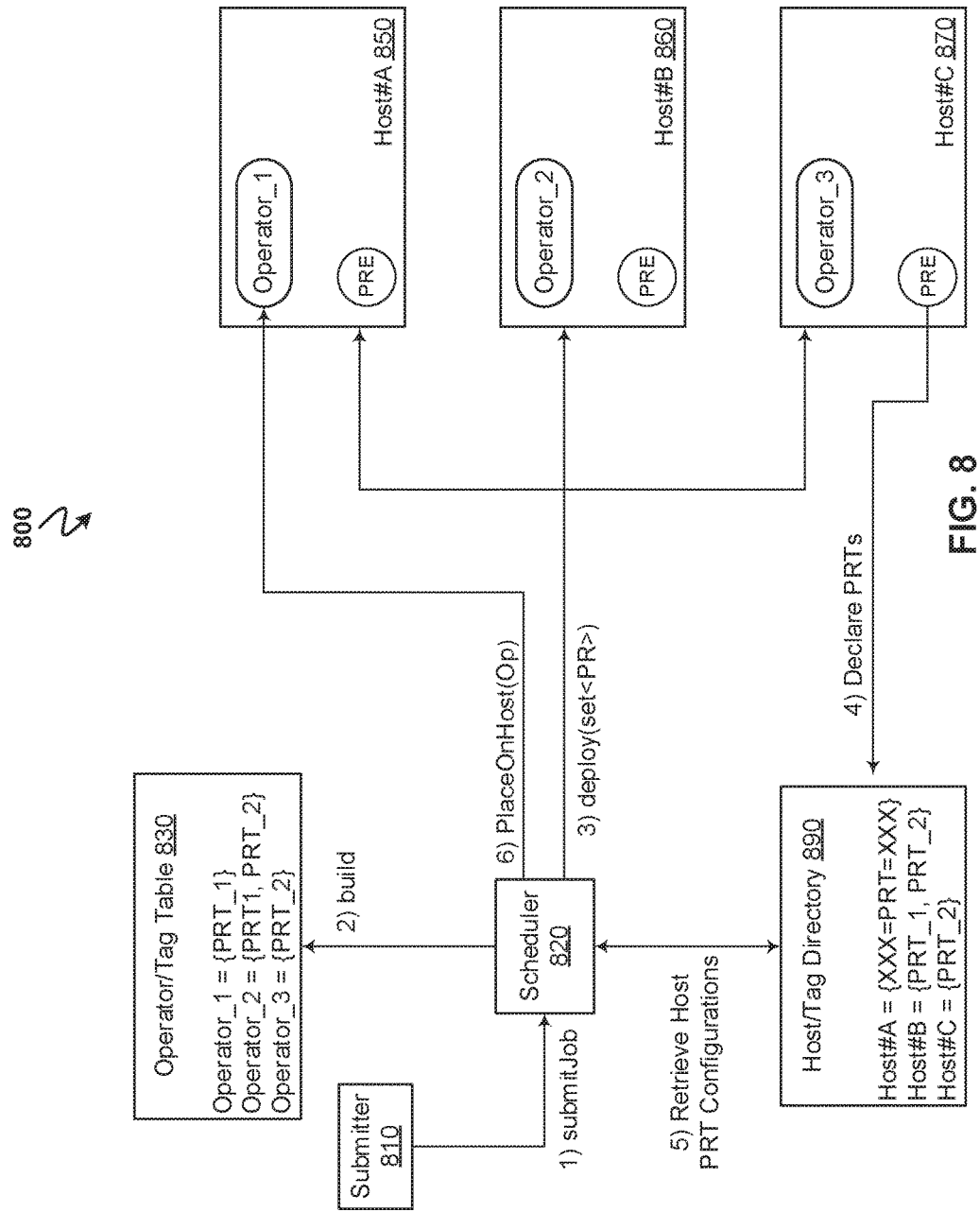
FIG. 8 illustrates an example stream computing environment having a set of hosts and a scheduler, according to embodiments.

FIG. 8 illustrates an example stream computing environment 800 having a set of hosts 850, 860, 870 and a scheduler 820 related to a job submission flow, according to embodiments. A job can submitted by a submitter module 810. The scheduler 820 can parse the job description into deployable operator code, and Placement Requirement (PR) code. The Operator/Tag table 830 may be built (e.g., by the scheduler 820). The scheduler 820 may subsequently deploy a set of PR modules to hosts that are candidates for placement of stream operators on. A set of Placement Requirement Evaluator (PRE) daemons may run (continuously) on the set of hosts 850, 860, 870. The PRs may be evaluated (e.g., periodically), and Placement Requirement Tags (PRTs) which achieve the appropriate set of criteria may be communicated to the Host/Tag Directory 890. In response to PREs being evaluated, the scheduler 820 can retrieve data from the Host/Tag directory 890 to be used as input into its scheduling determination process. Along with the PRT host tag requirements, other factors may also be considered or accounted for. Once the scheduling process completes, the scheduler 820 may places the stream operators on the appropriate hosts.

Placement Requirement Tag Definitions can be implemented in a multitude of ways (e.g., executable code, a type of declarative description). Consider the following illustrative example application.

```
MyApplication {
    Operator_1 {
        // business logic .....
        PlacementRequirementTagSet{ " PRT_1" }
    }
    Operator_2 {
        // business logic .....
        PlacementRequirementTagSet{ " PRT_1", "PRT_2" }
    }
    Operator_3 {
        // business logic .....
        PlacementRequirementTagSet{ " PRT_2" }
    }
    PlacementRequirementTagDefinitions {
        TagId("PRT_1") {
            // placement requirement tag logic
            if ({special hardware exists on host})
                assertThisTag;
        }
        TagId("PRT_2") {
            // placement requirement tag logic
            if ({100 GB of hard disk is available on host})
                assertThisTag;
        }
    }
}
```

Figure 9:
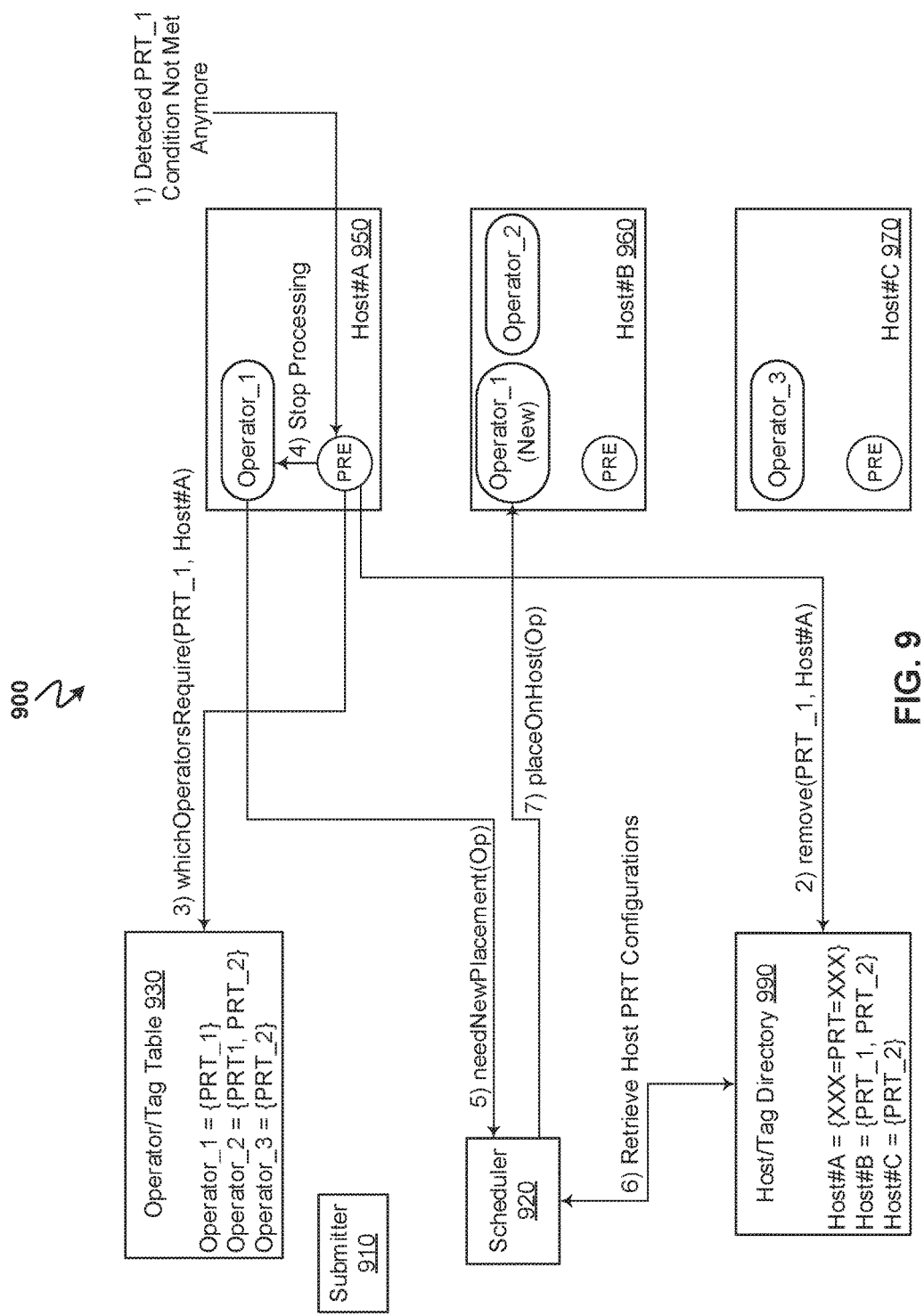
FIG. 9 illustrates an example stream computing environment having a set of hosts and a scheduler, according to embodiments.

FIG. 9 illustrates an example stream computing environment 900 having a set of hosts 950, 960, 970 and a scheduler 920 related to a placement requirement removal flow, according to embodiments. A PRE server may run on the hosts (e.g., periodically). If the PRE server detects that one or more PRT requirements are no longer met on a specific host, it may start a removal process. The PRE server may remove the PRT for the specific host from the Host/Tag directory 990. The PRE server can subsequently retrieve data from the Operator/Tag table 930 to determine which of the stream operators currently running on the specific host may need to be stopped. A particular operator may subsequently be stopped (e.g., by the PRE server). The operator stopping action can indicate/signal to the scheduler 920 that the particular operator should be moved to a new host that can meet the PRT requirements. The scheduler 920 can retrieve data from the updated Host/Tag directory 990. Placement processing may occur (e.g., reprocessing), and the particular operator may be placed onto a new host that meets the PRT requirements.

Aspects of the disclosure include an ability for an application to define a self-nominating/self-withdrawing clauses on an operator by operator basis. Feature may have performance or efficiency benefits with respect to a placement phase prior to the application running. As described herein, various stream operators/processing elements can be placed on various platforms. An application developer can specify at an operator level what the requirements are and the scheduler can properly fuse and place operators on nodes throughout the environment. The automated scheduler may allow the application developer to tell the scheduler what is needed by the operator and low water marks for resources. The scheduler can use this information to efficiently place the stream operator/processing element in the distributed environment. Historical data and predictive analytics may be used to provide hints to the scheduler. Such aspects can allow the scheduler to move processing element before they reach low water marks for resources and prevent down time during relocation.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for managing asset placement with respect to a distributed computing environment having a set of hosts, the method comprising:
   detecting, with respect to an asset for placement to the distributed computing environment, a set of host computing resource requirement data for the asset, wherein the distributed computing environment includes a stream computing environment and the asset is a rookie in the stream computing environment;
   identifying, with respect to the distributed computing environment, a set of computing resource profile data for the set of hosts;
   comparing, using a determination engine of at least one host of the set of hosts, the set of host computing resource requirement data for the asset and the set of computing resource profile data for the set of hosts to automatically determine an asset placement arrangement;
   establishing, based on the asset placement arrangement, the asset in the distributed computing environment;
   monitoring the set of hosts to update the set of computing resource profile data;
   updating, based on and in response to monitoring the set of hosts, the set of computing resource profile data;
   analyzing, using the determination engine of the at least one host of the set of hosts, the set of computing resource profile data to predict an expected change to the set of computing resource profile data, wherein the expected change would result in not meeting a criterion;
   resolving the expected change to the set of computing resource profile data; and
   reformulating, based on the expected change to the set of computing resource profile data, the asset placement arrangement.

2. The method of claim 1, wherein the distributed computing environment includes a stream computing environment.

3. The method of claim 2, wherein the set of hosts is heterogeneous in nature.

4. The method of claim 2, wherein the set of hosts has a configuration that is selected from the group consisting of:
   a first host having a first operating system and a second host having a second operating system;
   a first host having a first version of a first operating system and a second host having a second version of the first operating system; and a first host having a first hardware architecture and a second host having a second hardware architecture.

5. The method of claim 2, wherein the set of host computing resource requirement data for the asset is specified by an application writer.

6. The method of claim 2, wherein comparing the set of host computing resource requirement data for the asset and the set of computing resource profile data for the set of hosts is performed by the set of hosts, and wherein the set of hosts is a single host.

7. The method of claim 2, wherein the asset includes a set of processing elements.

8. The method of claim 2, wherein the asset includes a set of stream operators.

9. The method of claim 1, further comprising:
reformulating, based on and in response to updating the set of computing resource profile data, the asset placement arrangement; and
relocating, in response to updating the set of computing resource profile data and based on a reformulation of the asset placement arrangement, the asset to a different host of the set of hosts.

10. The method of claim 9, wherein the different host has a different operating system and a different hardware architecture.

11. The method of claim 2, further comprising:
preventing, with respect to the asset placement arrangement, placement of the asset on a first host of the set of hosts when a first computing resource profile data for the first host does not achieve the set of host computing resource requirement data for the asset; and
initiating, with respect to the asset placement arrangement, placement of the asset to a second host of the set of hosts when a second computing resource profile data for the second host achieves the set of host computing resource requirement data for the asset.

12. The method of claim 2, wherein the detecting, the identifying, the determining, and the establishing each occur in an automated fashion without user intervention.

13. The method of claim 7, further comprising:
receiving a stream of tuples to be processed by the set of processing elements operating on the set of hosts; and
processing, using the set of processing elements operating on the set of hosts, the stream of tuples.

14. The method of claim 13, further comprising:
metering use of the asset; and
generating an invoice based on the metered use.

15. A system for managing asset placement with respect to a distributed computing environment having a set of hosts, the system comprising:
a memory having a set of computer readable computer instructions, and a processor for executing the set of computer readable instructions, the set of computer readable instructions including:
detecting, with respect to an asset for placement to the distributed computing environment, a set of host computing resource requirement data for the asset, wherein the distributed computing environment includes a stream computing environment and the asset is a rookie in the stream computing environment;
identifying, with respect to the distributed computing environment, a set of computing resource profile data for the set of hosts;
comparing, using a determination engine of at least one host of the set of hosts, the set of host computing resource requirement data for the asset and the set of computing resource profile data for the set of hosts to automatically determine an asset placement arrangement;
establishing, based on the asset placement arrangement, the asset in the distributed computing environment;
monitoring the set of hosts to update the set of computing resource profile data;
updating, based on and in response to monitoring the set of hosts, the set of computing resource profile data;
analyzing, using the determination engine of the at least one host of the set of hosts, the set of computing resource profile data to predict an expected change to the set of computing resource profile data, wherein the expected change would result in not meeting a criterion;
resolving the expected change to the set of computing resource profile data; and
reformulating, based on the expected change to the set of computing resource profile data, the asset placement arrangement.

16. A computer program product for managing asset placement with respect to a distributed computing environment having a set of hosts, the computer program product comprising a computer readable storage medium having program instructions embodied therewith, wherein the computer readable storage medium is not a transitory signal per se, the program instructions executable by a processor to cause the processor to perform a method comprising:
detecting, with respect to an asset for placement to the distributed computing environment, a set of host computing resource requirement data for the asset, wherein the distributed computing environment includes a stream computing environment and the asset is a rookie in the stream computing environment;
identifying, with respect to the distributed computing environment, a set of computing resource profile data for the set of hosts;
comparing, using a determination engine of at least one host of the set of hosts, the set of host computing resource requirement data for the asset and the set of computing resource profile data for the set of hosts to automatically determine an asset placement arrangement;
establishing, based on the asset placement arrangement, the asset in the distributed computing environment;
monitoring the set of hosts to update the set of computing resource profile data;
updating, based on and in response to monitoring the set of hosts, the set of computing resource profile data;
analyzing, using the determination engine of the at least one host of the set of hosts, the set of computing resource profile data to predict an expected change to the set of computing resource profile data, wherein the expected change would result in not meeting a criterion;
resolving the expected change to the set of computing resource profile data; and
reformulating, based on the expected change to the set of computing resource profile data, the asset placement arrangement.

17. The computer program product of claim 16, wherein at least one of:
the program instructions are stored in the computer readable storage medium in a data processing system, and wherein the program instructions were downloaded over a network from a remote data processing system; or the program instructions are stored in the computer readable storage medium in a server data processing system, and wherein the program instructions are downloaded over a network to a remote data processing system for use in a second computer readable storage medium with the remote data processing system.

* * * * *